US 10,822,815 B1

(12) United States Patent
Vance

(10) Patent No.: US 10,822,815 B1
(45) Date of Patent: Nov. 3, 2020

(54) CIRCULAR PERFORATED DRYWALL TAPE

(71) Applicant: Paul Vance, Spanaway, WA (US)

(72) Inventor: Paul Vance, Spanaway, WA (US)

( * ) Notice: Subject to any disclaimer, the term of this patent is extended or adjusted under 35 U.S.C. 154(b) by 0 days.

(21) Appl. No.: 16/357,550

(22) Filed: Mar. 19, 2019

(51) Int. Cl.
*E04F 21/165* (2006.01)
*F16L 5/10* (2006.01)
*F16L 5/02* (2006.01)

(52) U.S. Cl.
CPC .......... *E04F 21/1657* (2013.01); *F16L 5/027* (2013.01); *F16L 5/10* (2013.01)

(58) Field of Classification Search
CPC .......... E04F 21/1657; F16L 5/027; F16L 5/10
See application file for complete search history.

(56) References Cited

U.S. PATENT DOCUMENTS

| | | | | |
|---|---|---|---|---|
| 4,500,580 A * | 2/1985 | Luciani | .................. | E04F 13/08 428/131 |
| 4,776,906 A * | 10/1988 | Bernard | .................. | B29C 63/02 156/256 |
| 5,384,174 A * | 1/1995 | Ward | ...................... | A61F 5/443 206/440 |
| 5,393,106 A * | 2/1995 | Schroeder | ............. | F16L 41/082 285/136.1 |
| D370,259 S | 5/1996 | Teich | | |
| 5,564,756 A * | 10/1996 | Hamilton | ................ | F16L 47/28 285/222 |
| 5,640,820 A * | 6/1997 | Wood | .................. | E04G 23/0203 52/100 |
| 6,244,633 B1 * | 6/2001 | Warren | .................. | F16L 37/008 285/141.1 |
| 6,627,292 B1 * | 9/2003 | Hoffmann, Sr. | ........ | B29C 73/04 428/139 |
| 7,758,957 B2 * | 7/2010 | McTaggart | ................. | C09J 7/20 428/343 |
| 8,178,197 B2 * | 5/2012 | Segur | ........................ | F16L 5/10 277/312 |
| 8,486,525 B2 * | 7/2013 | Segur | ........................ | F16L 5/02 428/343 |
| 8,747,595 B2 * | 6/2014 | Fidan | ........................ | C09J 7/28 156/196 |
| 2003/0096076 A1 * | 5/2003 | Allison | ...................... | C09J 7/20 428/43 |
| 2003/0228436 A1 | 12/2003 | Ishimura | | |
| 2006/0027388 A1 * | 2/2006 | Collins | ..................... | H02G 3/22 174/663 |
| 2006/0107617 A1 * | 5/2006 | Scott | .................. | A47G 27/0481 52/750 |
| 2006/0147667 A1 * | 7/2006 | Salmon | ...................... | C09J 7/38 428/42.3 |
| 2006/0191237 A1 * | 8/2006 | Hansen | .................... | E04F 13/04 52/746.1 |

(Continued)

FOREIGN PATENT DOCUMENTS

WO 2010053501 5/2010

*Primary Examiner* — Joshua K Ihezie

(57) ABSTRACT

The circular perforated drywall tape comprises a joint tape, a pipe, and a drywall panel. The drywall panel further comprises a pipe aperture. The pipe passes through the pipe aperture. The circular perforated drywall tape seals the joint between the drywall panel and the pipe. The circular perforated drywall tape is perforated such that a removable knock out sizes the joint tape to match the size of the joint between the drywall panel and the pipe.

8 Claims, 4 Drawing Sheets

(56) References Cited

U.S. PATENT DOCUMENTS

| | | | |
|---|---|---|---|
| 2008/0034694 A1* | 2/2008 | Banta | B32B 15/02 |
| | | | 52/417 |
| 2008/0085366 A1* | 4/2008 | Lian | B65H 37/005 |
| | | | 427/282 |
| 2008/0102240 A1* | 5/2008 | Serra | C09J 133/14 |
| | | | 428/41.8 |
| 2009/0044395 A1* | 2/2009 | Goldman | E04F 21/165 |
| | | | 29/426.2 |
| 2015/0323103 A1* | 11/2015 | Coscarella | F16L 5/10 |
| | | | 277/314 |
| 2016/0076673 A1* | 3/2016 | Rule | C09J 7/38 |
| | | | 156/187 |
| 2016/0312480 A1* | 10/2016 | Zinssler | E04F 13/042 |

* cited by examiner

CIRCULAR PERFORATED DRYWALL TAPE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building and finishing work on buildings and finishing work on buildings including coverings and linings, more specifically, a joint tape. (E04F13/042)

SUMMARY OF INVENTION

The circular perforated drywall tape comprises a joint tape, a joint compound, a pipe, and a drywall panel. The drywall panel further comprises a pipe aperture. The pipe passes through the pipe aperture. The circular perforated drywall tape with compound seals the joint between the drywall panel and the pipe. The circular perforated drywall tape is perforated such that a removable knock out sizes the joint tape to match the size of the joint between the drywall panel and the pipe.

These together with additional objects, features and advantages of the circular perforated drywall tape will be readily apparent to those of ordinary skill in the art upon reading the following detailed description of the presently preferred, but nonetheless illustrative, embodiments when taken in conjunction with the accompanying drawings.

In this respect, before explaining the current embodiments of the circular perforated drywall tape in detail, it is to be understood that the circular perforated drywall tape is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the circular perforated drywall tape.

It is therefore important that the claims be regarded as including such equivalent construction insofar as they do not depart from the spirit and scope of the circular perforated drywall tape. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
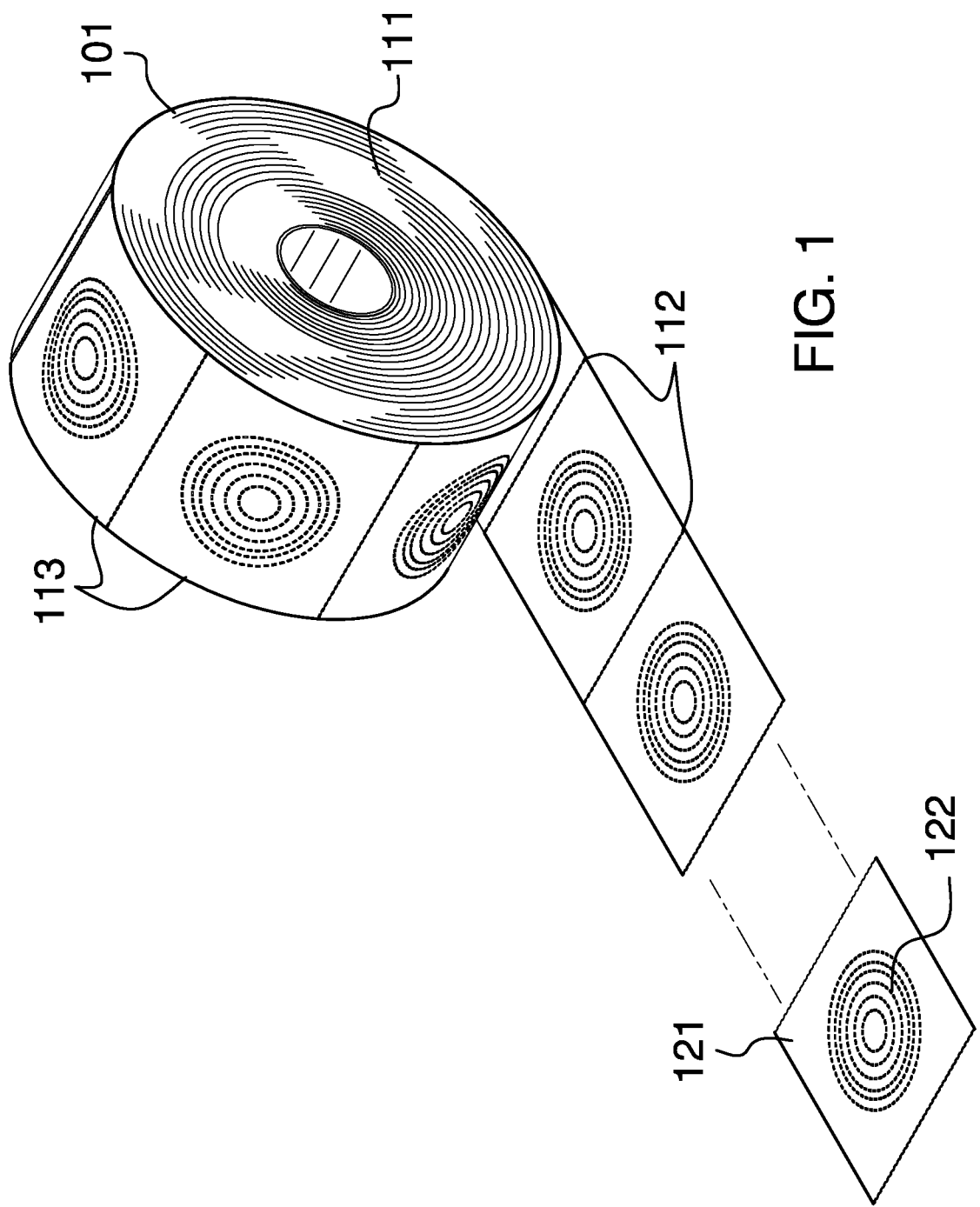
FIG. 1 is a perspective view of an embodiment of the disclosure.
Figure 2:
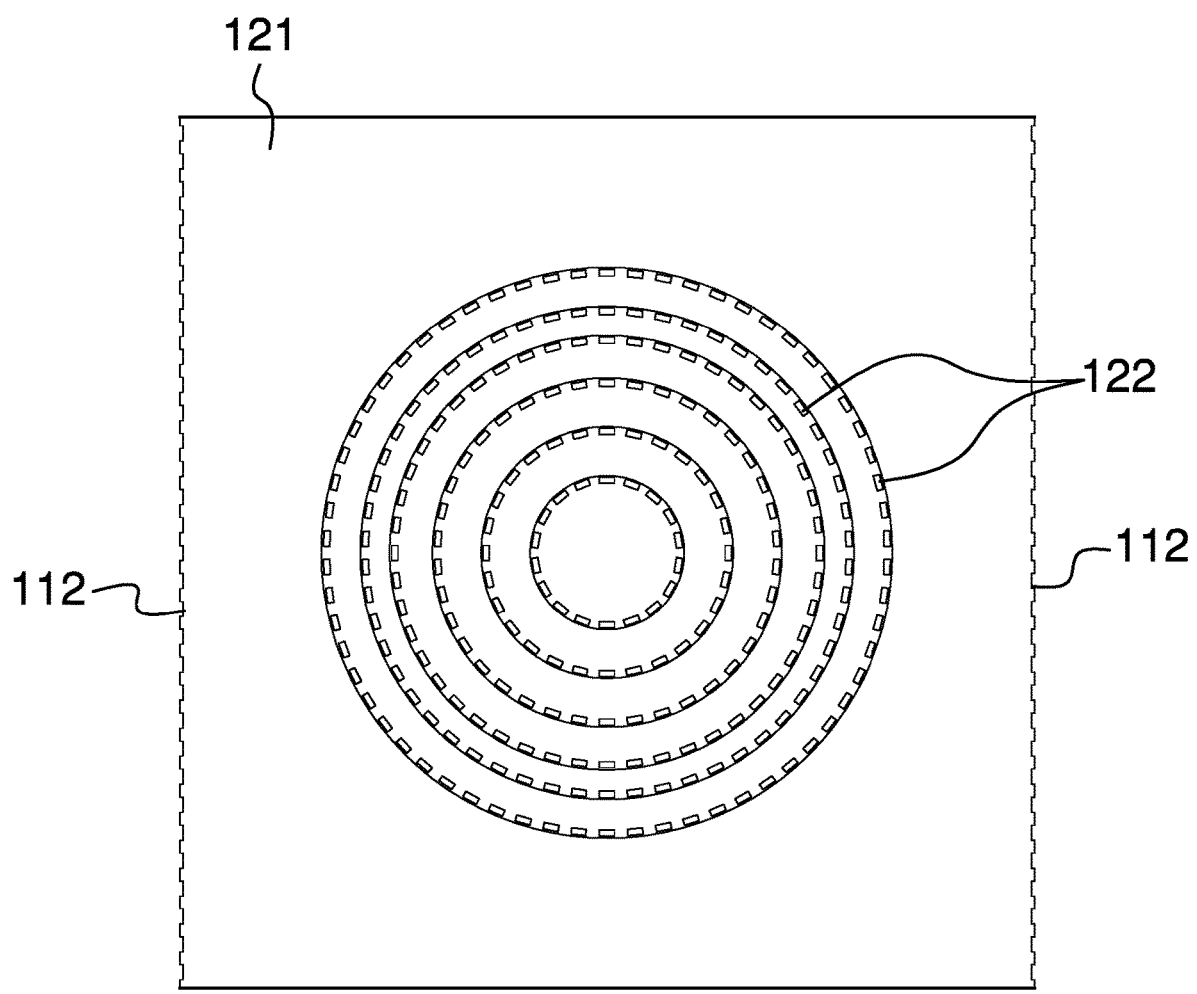
FIG. 2 is a front view of an embodiment of the disclosure.
Figure 3:
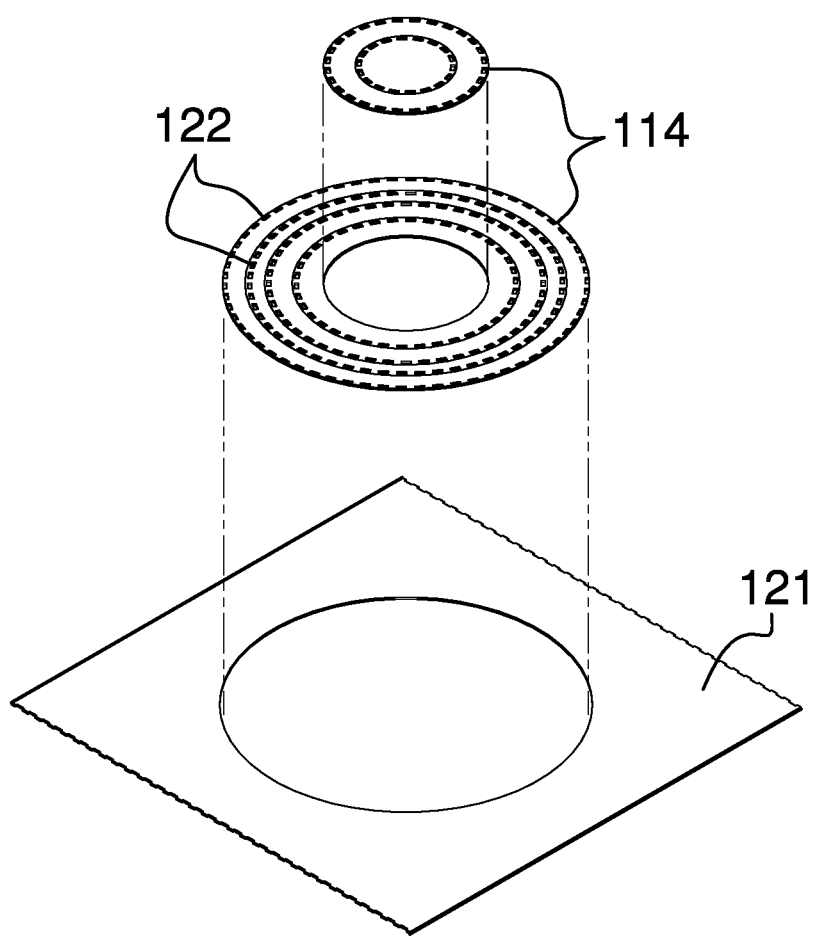
FIG. 3 is an exploded view of an embodiment of the disclosure.
Figure 4:
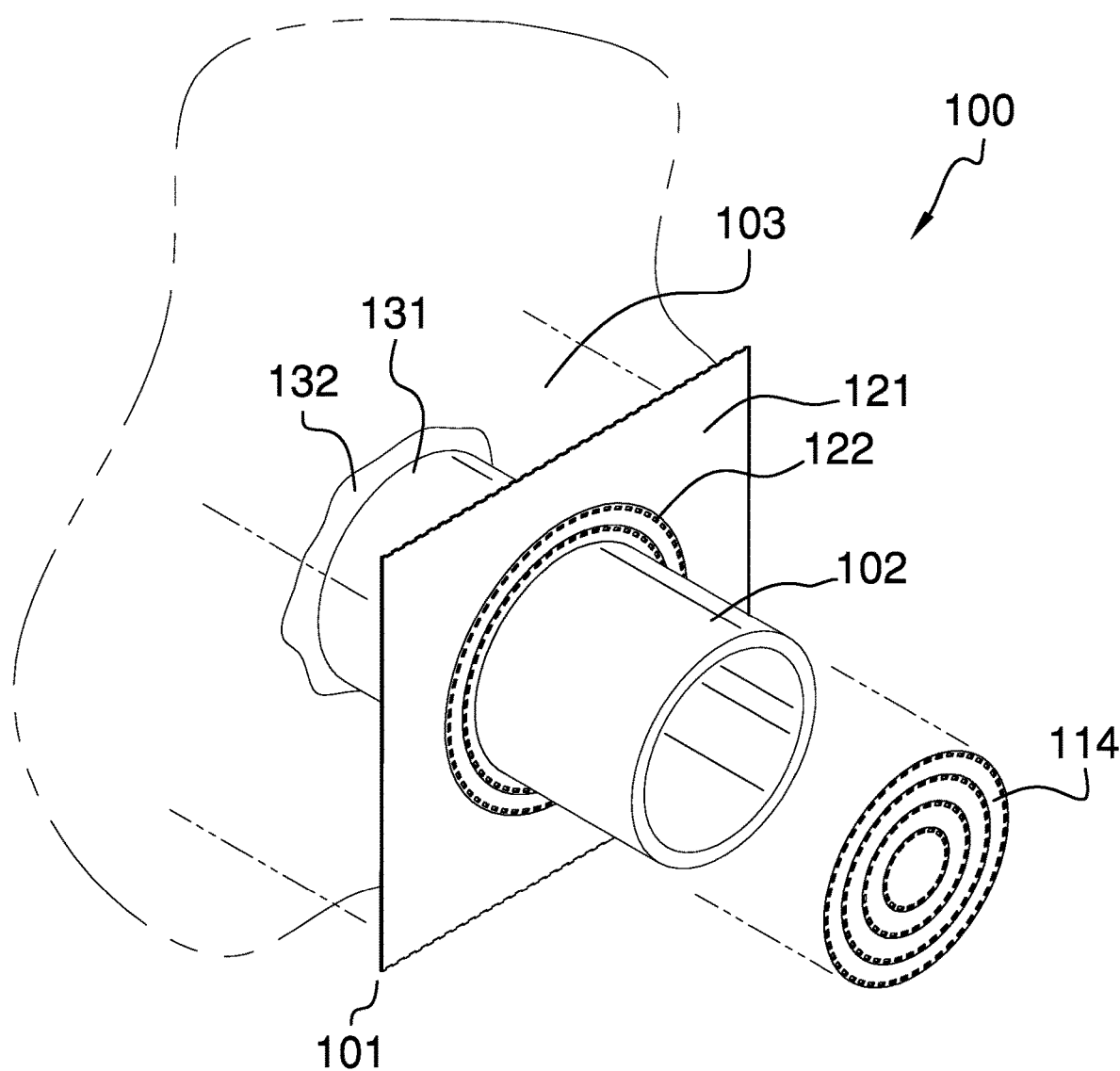
FIG. 4 is an in-use view of an embodiment of the disclosure.

Detailed reference will now be made to one or more potential embodiments of the disclosure, which are illustrated in FIGS. 1 through 4.

The circular perforated drywall tape 100 (hereinafter invention) comprises a joint 132 tape 101, a pipe 102, and a drywall panel 103. The drywall panel 103 further comprises a pipe 102 aperture 131. The pipe 102 passes through the pipe 102 aperture 131. The invention 100 seals the joint 132 between the drywall panel 103 and the pipe 102. The invention 100 is perforated such that a removable knock out 114 sizes the joint 132 tape 101 to match the size of the joint 132 between the drywall panel 103 and the pipe 102.

The pipe 102 is a rigid structure. The pipe 102 is a hollow cylindrical structure. The pipe 102 is further defined with an outer diameter. The pipe 102 is configured to transport a fluid through the barrier formed by a drywall panel 103.

The drywall panel 103 is a plate structure commonly used in the construction arts. One or more drywall panels 103 are positioned to form a wall. The drywall panel 103 forms a barrier that protects the interior space of a room from the transport facilities commonly used for utilities such as water, sewage, natural gas, and electricity. The drywall panel 103 protects occupants within the room from potential hazards presented by the transport of these utilities. The drywall panel 103 further comprises a pipe 102 aperture 131. The pipe 102 aperture 131 is a circular aperture that is formed through the drywall panel 103.

The joint 132 is formed between the pipe 102 and the pipe 102 aperture 131 of the drywall panel 103 after the pipe 102 inserts through the pipe 102 aperture 131. The joint 132 is defined in greater detail elsewhere in this disclosure.

The joint 132 tape 101 is a specialized tape. The joint 132 tape 101 covers the joint 132 formed between the pipe 102 and the drywall panel 103 when the pipe 102 projects through the drywall panel 103. The joint 132 tape 101 is applied using drywall joint compound around the pipe 102 and the drywall panel 103. The joint 132 tape 101 attaches to the pipe 102 and the drywall panel 103 such that the joint 132 tape 101 covers the joint 132 between the pipe 102 and the drywall panel 103.

The joint 132 tape 101 is formed with a circular aperture. The span of the length of the inner diameter of the circular aperture through the joint 132 tape 101 is greater than the outer diameter of the pipe 102 such that the joint 132 tape 101 will fit over the pipe 102 during the application of the joint 132 tape 101 over the joint 132.

The joint 132 tape 101 comprises a scroll 111, a plurality of segment perforations 112, and a plurality of patches 113. Each of the plurality of patches 113 is further defined with a knock out 114.

The scroll 111 refers to the sheeting that forms the joint 132 tape 101. The scroll 111 further describes the storage structure that contains the joint 132 tape 101. The scroll 111 is organized with the plurality of segment perforations 112.

Each of the plurality of segment perforations 112 is a linear perforation. Each of the plurality of segment perforations 112 bifurcates the scroll 111 such that the plurality of patches 113 are formed within the scroll 111 between any two adjacent segment perforations selected from the plurality of segment perforations 112. Each of the plurality of segment perforations 112 allows each of the plurality of patches 113 to be readily torn off the scroll 111.

Each of the plurality of patches 113 is a square sheeting. Each of the plurality of patches 113 are assembled in a linear fashion to form the scroll 111. Each of the plurality of patches 113 are interconnected using the plurality of segment perforations 112. Each of the plurality of patches 113 forms the segment of the joint 132 tape 101 that covers the joint 132 between the pipe 102 and the pipe 102 aperture 131. A surface of each of the plurality of patches 113 is applied with joint compound such that each patch selected from the plurality of patches 113 adheres to the joint 132 formed between the pipe 102 and the pipe 102 aperture 131.

Each of the plurality of patches 113 comprises a square sub-sheeting 121 and a plurality of concentric perforations 122.

The square sub-sheeting 121 is a square sheeting that is removed from the sheeting that forms the joint 132 tape 101. Each square sub-sheeting 121 is removed from the joint 132 tape 101 by tearing the square sub-sheeting 121 off at the segment perforation selected from the plurality of segment perforations 112 that was associated with the square sub-sheeting 121. The square sub-sheeting 121 forms the physical structure that covers the joint 132 between the pipe 102 and the pipe 102 aperture 131. The square sub-sheeting 121 forms an independent sealed structure.

Each of the plurality of concentric perforations 122 is a perforation formed in the square sub-sheeting 121. Each of the plurality of concentric perforations 122 forms a circular shape. Each of the plurality of concentric perforations 122 is further defined with an inner diameter. Each of the plurality of concentric perforations 122 are coaxially aligned to form concentric circles.

Each of the plurality of concentric perforations 122 comprises a knock out 114. The knock out 114 is a section of any concentric perforation selected from the plurality of concentric perforations 122 that is removed to form an aperture through which the pipe 102 inserts as the selected patch is applied to the joint 132 between the pipe 102 and the pipe 102 aperture 131.

The knock out 114 is removed by removing a portion of the square sub-sheeting 121 that is bounded by a concentric perforation selected from the plurality of concentric perforations 122. The specific concentric perforation selected from the plurality of concentric perforations 122 is determined by the outer diameter of the pipe 102 the square sub-sheeting 121 is intended to cover. The specific concentric perforation is selected such that the inner diameter of the knock out 114 that is formed by the removal of the selected concentric perforation is greater than the outer diameter of the pipe 102. This arrangement of the plurality of concentric perforations 122 allows the square sub-sheeting 121 to be customized for the pipe 102.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Coaxial: As used in this disclosure, coaxial is a term that refers to a first object that is inserted or contained within a second object such: 1) that the first object and the second object share the same center point if the or first object and the second object are treated as a two-dimensional objects; or, 2) that the first object and the second object share the same center axis if the or first object and the second object are treated as a prism. Coaxial objects are often referred to as concentric.

Cylinder: As used in this disclosure, a cylinder is a geometric structure defined by two identical flat and parallel ends, also commonly referred to as bases, which are circular in this disclosure as the lateral face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Drywall: As used in this material, drywall refers to a plate structure used to form a portion of a vertical surface commonly called a wall.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Gas: As used in this disclosure, a gas refers to a state (phase) of matter that is fluid and that fills the volume of the structure that contains it. Stated differently, the volume of a gas always equals the volume of its container.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inner Diameter: As used in this disclosure, the term inner diameter is used in the same way that a plumber would refer to the inner diameter of a pipe.

Joint: As used in this disclosure, a joint refers to a point, a line, or a surface that joins a first structure to a second structure.

Joint Tape: As used in this disclosure, joint tape refers to a drywall tape used to cover the seam formed by the juxtaposition of two drywall panels.

Knock-Out: As used in this disclosure, a knock-out is an enclosed surface area (typically circular in shape) that is contained within a larger surface area. The perimeter of the knock-out is perforated such that the knock-out may be removed thereby forming an aperture through the larger surface area.

Liquid: As used in this disclosure, a liquid refers to a state (phase) of matter that is fluid and that maintains, for a given pressure, a fixed volume that is independent of the volume of the container.

Outer Diameter: As used in this disclosure, the term outer diameter is used in the same way that a plumber would refer to the outer diameter of a pipe.

Perforation: A used in this disclosure, a perforation refers to a series of small holes that are formed in a material in such a way as to allow a portion of the material to be easily torn off. The material that contains the perforations is referred to as the perforated material.

Pipe: As used in this disclosure, a pipe is a hollow cylindrical device that is used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Rigid Structure: As used in this disclosure, a rigid structure is a solid structure formed from an inelastic material that resists changes in shape. A rigid structure will permanently deform as it fails under a force.

Roll: As used in this disclosure, a roll is a method of storing paper or other sheeting in a cylindrical structure such that creases are not formed within the paper or sheeting. To form the roll, the paper or other sheeting material is curved over itself around a center axis such that a spiral is formed when the roll is viewed from the end of the cylindrical structure.

Scroll: As used in this disclosure, a scroll is a sheeting that is stored as a roll.

Sheeting: As used in this disclosure, a sheeting is a material, such as a paper, textile, a plastic, or a metal foil, in the form of a thin flexible layer or layers.

Tape: As used in this disclosure, tape refers to a flexible and narrow strip of textile or sheeting that fastens, secures, or strengthens an object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface of a chamber.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A perforated masking structure comprising:
a joint tape, a pipe, and a drywall panel;
wherein the pipe passes through the drywall panel;
wherein the pipe and the drywall panel forms a joint;
wherein the joint tape seals the joint between the drywall panel and the pipe;
wherein the drywall panel further comprises a pipe aperture;
wherein the pipe passes through the pipe aperture;
wherein the joint tape is perforated;
wherein the joint tape further comprises a one or more knock outs;
wherein the one or more knock outs are removable;
wherein the pipe is a rigid structure;
wherein the pipe is a hollow cylindrical structure;
wherein the pipe is further defined with an outer diameter;
wherein the drywall panel is a plate structure;
wherein the pipe aperture is a circular aperture that is formed through the drywall panel;
wherein the joint is formed between the pipe and the pipe aperture of the drywall panel after the pipe inserts through the pipe aperture;
wherein the joint tape is a drywall tape;
wherein the joint tape covers the joint formed between the pipe and the drywall panel after the pipe inserts through the drywall panel;
wherein the joint tape is adhered using joint compound around the pipe and the drywall panel;
wherein the joint tape comprises a scroll, a plurality of segment perforations, and a plurality of patches;
wherein the plurality of segment perforations and the plurality of patches are formed in the scroll;
wherein each of the plurality of patches contains a knock out selected from the one or more knock outs;
wherein the scroll is a sheeting that forms the joint tape;
wherein the scroll forms storage structure that contains the joint tape;
wherein the scroll is organized by the plurality of segment perforations;
wherein each of the plurality of segment perforations is a linear perforation;
wherein each of the plurality of segment perforations bifurcates the scroll such that the plurality of patches are formed within the scroll between any two adjacent segment perforations selected from the plurality of segment perforations;
wherein each of the plurality of patches is a square sheeting;
wherein each of the plurality of patches are assembled in a linear fashion to form the scroll;
wherein each of the plurality of patches are interconnected using the plurality of segment perforations;

wherein each of the plurality of patches forms the segment of the joint tape that covers the joint between the pipe and the pipe aperture;

wherein each of the plurality of patches comprises a square sub-sheeting and a plurality of concentric perforations;

wherein the plurality of concentric perforations are formed in the square sub-sheeting;

wherein the square sub-sheeting forms the physical structure that covers the joint between the pipe and the pipe aperture;

wherein the plurality of concentric perforations forms a knock out selected from the one or more knock outs.

2. The perforated masking structure according to claim 1 wherein the joint tape is formed with a circular aperture;

wherein the circular aperture is formed by the one or more knock outs;

wherein a span of a length of an inner diameter of the circular aperture through the joint tape is greater than the outer diameter of the pipe such that the joint tape will fit over the pipe during the application of the joint tape over the joint.

3. The perforated masking structure according to claim 1 wherein the square sub-sheeting is a square sheeting that is removed from the sheeting that forms the joint tape;

wherein each square sub-sheeting is removed from the joint tape by tearing the square sub-sheeting off at the segment perforation selected from the plurality of segment perforations that was associated with the square sub-sheeting.

4. The perforated masking structure according to claim 3 wherein the square sub-sheeting forms an independent sealing structure.

5. The perforated masking structure according to claim 4 wherein each of the plurality of concentric perforations is a perforation formed in the square sub-sheeting;

wherein each of the plurality of concentric perforations forms a circular shape;

wherein each of the plurality of concentric perforations is further defined with an inner diameter.

6. The perforated masking structure according to claim 5 wherein each of the plurality of concentric perforations are coaxially aligned to form concentric circles.

7. The perforated masking structure according to claim 6 wherein the knock out is a section of any concentric perforation selected from the plurality of concentric perforations that is removed to form an aperture through which the pipe inserts as the selected patch is applied to the joint with joint compound between the pipe and the pipe aperture;

wherein the knock out is removed by removing a portion of the square sub-sheeting that is bounded by a concentric perforation selected from the plurality of concentric perforations.

8. The perforated masking structure according to claim 7 wherein a specific concentric perforation selected from the plurality of concentric perforations is determined by the outer diameter of the pipe the square sub-sheeting is intended to cover;

wherein the specific concentric perforation is selected such that the inner diameter of the knock out that is formed by the removal of the selected concentric perforation is greater than the outer diameter of the pipe.

\* \* \* \* \*